United States Patent [19]

Schwendeman et al.

[11] Patent Number: 4,914,649
[45] Date of Patent: Apr. 3, 1990

[54] MULTIPLE FREQUENCY MESSAGE SYSTEM

[75] Inventors: Robert J. Schwendeman, Pompano Beach; David F. Willard, Plantation, both of Fla.

[73] Assignee: Motorola, Inc., Schaumburg, Ill.

[21] Appl. No.: 243,869

[22] Filed: Sep. 12, 1988

[51] Int. Cl.$^4$ .............................................. H04Q 7/00
[52] U.S. Cl. ..................................... 370/50; 370/95.1; 455/32; 455/34; 340/825.44
[58] Field of Search ....................... 455/32, 33, 34, 35, 455/38, 51, 56; 370/50, 76, 94, 95, 120; 379/57; 340/825.03, 825.04, 825.44

[56] References Cited

U.S. PATENT DOCUMENTS

| | | | |
|---|---|---|---|
| 4,086,537 | 4/1978 | Asakawa et al. | 325/478 |
| 4,392,135 | 7/1983 | Ohyagi | 455/34 |
| 4,398,192 | 8/1983 | Moore et al. | 340/825.44 |
| 4,551,855 | 11/1985 | Kurosaki et al. | 455/32 |
| 4,644,347 | 2/1987 | Lucas et al. | 455/34 |
| 4,658,416 | 4/1987 | Tanaka | 379/57 |
| 4,679,225 | 7/1987 | Higashiyama | 455/32 |
| 4,718,109 | 1/1988 | Breeden et al. | 455/51 |
| 4,736,461 | 4/1988 | Kawasaki et al. | 455/35 |
| 4,741,049 | 4/1988 | De Jager et al. | 455/34 |
| 4,747,101 | 5/1988 | Akaiwa et al. | 455/34 |
| 4,748,681 | 5/1988 | Schmidt | 370/95 |
| 4,755,816 | 7/1988 | DeLuca | 455/38 |
| 4,779,262 | 10/1988 | Avis et al. | 370/50 |
| 4,792,984 | 12/1988 | Matsuo | 455/34 |
| 4,839,639 | 6/1989 | Sato et al. | 340/825.44 |

OTHER PUBLICATIONS

A Standard Code for Radiopaging–a report of the Studies of the British Post Office Code Standardisation Advisory Group (POCSAG)–copyright the British Post Office, 1978/1979.

New Radio Paging System by M. Komura, A. Yokokura, T. Hagihira & M. Ogasawara published Jul., 1977.

The Application of Coding Techniques to Radiopaging by R. H. Tridgell, published 3/1980 in the Proceedings of the Swiss Federal Institute of Technology.

Primary Examiner—Douglas W. Olms
Assistant Examiner—Alpus H. Hsu
Attorney, Agent, or Firm—Philip P. Macnak; Vincent B. Ingrassia; Anthony J. Sarli, Jr.

[57] ABSTRACT

A multiple frequency message system includes a transmitter for transmitting coded message signals on a plurality of channels of which at least one channel to be assigned to each of a plurality of geographical areas. The coded message signals include channel identification information and message information being transmitted in a sequence of coded transmission slots on each of the plurality of channels. The sequence of coded transmission slots are transmitted offset in time such that a particular transmission slot is not simultaneously transmitted on any of the plurality of channels in each geographical area.

A receiver capable of receiving the coded message signals during a predetermined coded transmission slot being transmitted on the plurality of channels is also provided. The receiver includes a channel selecting circuit responsive to the detected channel identification information during the predetermined transmission slot for maintaining operation on a predetermined channel or, for sequentially receiving the predetermined transmission slot on each of the plurality of channels.

20 Claims, 7 Drawing Sheets

*400*

MULTIPLE FREQUENCY MESSAGE SYSTEM

FIELD OF THE INVENTION

The present invention relates to electromagnetic wave receivers operating in multiple frequency messaging systems, and more particularly, to electromagnetic wave receivers capable of selectively scanning a plurality of frequencies and receiving messages provided thereon.

DESCRIPTION OF THE PRIOR ART

Numerous messaging systems are in operation today providing for the delivery of numeric and alphanumeric messages to electromagnetic wave receivers, such as communication receivers, and pagers. These messaging systems provide varied operating characteristics, such as those regarding message throughput, paging receiver battery saving, and local and area-wide paging, or local and nationwide paging capabilities. These systems may be further characterized by providing these capabilities on single or multiple frequencies, or channels. Of those systems in operation today, most can be characterized as primarily single frequency systems. Examples of single frequency systems include such systems as simulcast transmission systems which utilize such binary signaling formats as the Golay Sequential Code, or GSC signaling format, the POCSAG signaling format, and the Nippon Telephone and Telegraph, or NTT signaling format. These systems are further characterized as providing synchronous or asynchronous operation for message delivery. The Golay Sequential Code and POCSAG signalling formats are used in asynchronous systems, while the NTT signaling format provides for synchronous system operation.

A number of systems in use provide multiple frequency operation to facilitate area-wide or nationwide paging. Examples of such multiple frequency systems include those operated by the British Post Office, or BPO signaling format, and the Dutch Post Office, or PTT, signaling format. Both systems utilize multiple frequencies, and transmitter frequency switching to achieve the required coverage locally and nationwide.

Other systems have also been proposed which utilize one or more of the previously mentioned signaling formats, to provide nationwide paging capability. One example of such a system is described by Lucas et al., U.S. Pat. No. 4,644,347, entitled "Multiple Frequency Message System", assigned to the assignee of the present invention which provides a nationwide paging system having one or more local channels, and at least one nationwide channel in each geographic area covered by the system. In each geographic area, both local and nationwide channels share a common channel identification code to which receivers are responsive for selecting the local or nationwide channel.

A more recent proposal has been to provide a number of channels in each geographical area of operation which can be scanned by pagers operating in those areas. Each channel's transmission time is subdivided into a small time interval preceded by header information identifying the interval for non-local, or nationwide, paging traffic, such as a time interval one-sixteenth the transmission cycle time, with the balance of the cycle time being allocated only for local traffic. The header identifies which segment of the transmission time is to be monitored by the different pagers, either local or non-local pagers which are often referred to as roaming. This system, in particular, decreased the available transmission time of non-local messages compared to that of locally delivered messages, as compared to dedicated channel systems, as proposed by Lucas et al. This could easily create large message backlogs in areas of heavy non-local traffic utilization. Most systems which have been proposed for channel scanning receiver operation present other problems, such as missed messages in weak signal conditions resulting from incorrect channel identification or header information decoding, and the resultant error causing the pager to scan for time intervals long enough to miss messages intended for the pager on the assigned channel.

SUMMARY OF THE INVENTION

It is therefore an object of the present invention to provide a multiple frequency messaging system more effectively utilizing frequency scanning pagers.

It is a further object of the present invention to provide a multiple frequency messaging system facilitating local and nationwide paging.

It is a further object of the present invention to provide a multiple frequency messaging system offering improved channel capacity for nationwide traffic.

It is a further object of the present invention to provide a multiple frequency messaging system offering reliable message delivery to scanning pagers.

It is a further object of the present invention to provide a multiple frequency messaging system providing improved battery saver operation for scanning pagers operating in the scanning environment.

In order to accomplish the aforementioned objectives according to the present invention, a transmitter system for transmitting coded message signals on a plurality of channels is provided. The transmitter system provides at least one channel to be assigned to each of a plurality of geographical areas. The coded message signals transmitted include individual channel identification information and message information being transmitted in a sequence of coded transmission slots on each of the plurality of channels. The sequence of coded transmission slots are transmitted offset such that any particular transmission slot is not simultaneously transmitted on any of the plurality of channels.

A receiver capable of receiving the coded message signals during a predetermined coded transmission slot being transmitted on the plurality of channels is also provided. The receiver includes a channel selecting circuit responsive to not detecting predetermined channel identification information transmitted during the predetermined transmission slot on a predetermined channel, thereafter sequentially receiving the predetermined transmission slot on each of the plurality of channels.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in, which:

DESCRIPTION OF THE PREFERRED EMBODIMENT

Figure 1:
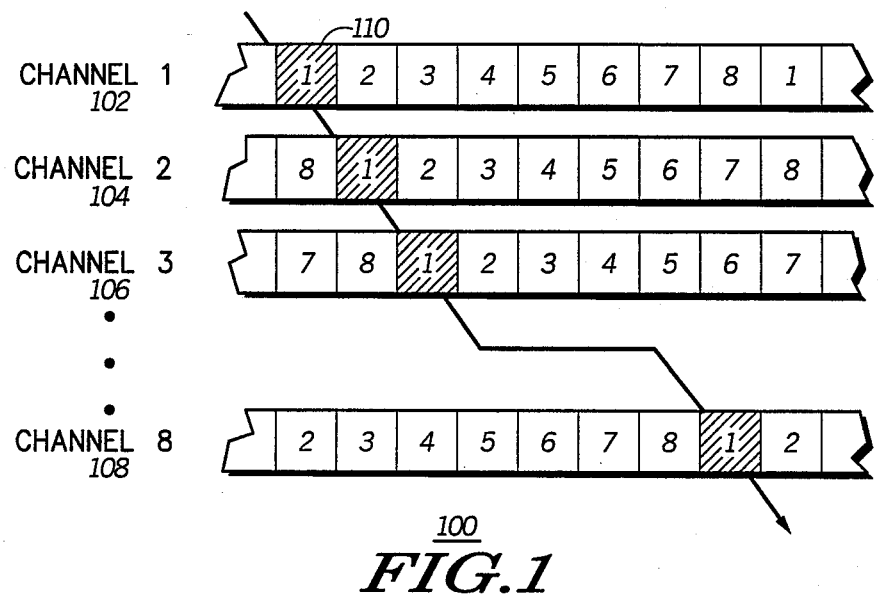
FIG. 1 shows a timing diagram for the multiple frequency messaging system operation provided by of the preferred embodiment of the present invention.

Referring now to the drawings, FIGS. 1-7 show the preferred embodiment of the present invention. In particular, FIG. 1 shows the timing diagram for a multiple frequency messaging system provided by the preferred embodiment of the present invention. The system comprises a plurality of channels, indicated as channel 102, channel 104, channel 106 and channel 108 assigned singly or in combination in a plurality of geographical areas. While FIG. 1 particularly shows eight channels, it will be appreciated by one of ordinary skill in the art that the actual number of channels provided in a system and assigned to each geographical area is a function of the number of system subscribers, or users. Messages are transmitted on each channel, grouped into transmission slots 110, to which individual pagers are assigned. As shown in FIG. 1, each channel is subdivided into a sequence of transmission slots, eight in the example of FIG. 1, although it will be appreciated that the number of transmission slots required for operation may be more or less depending upon the number of subscribers to be served by the system. In the preferred embodiment of the present invention, the number of transmission slots provided on a channel corresponds to the number of channels provided in the system. Consequently, eight transmission slots are provided for an eight channel system, or sixteen transmission slots are provided for a sixteen channel system. As shown in FIG. 1, all transmission slots are coded to identify the transmission slot and are synchronously transmitted on each channel. The transmission slots are offset by one complete slot on each channel such that any particular transmission slot is not simultaneously transmitted on any of the plurality of channels. This allows a pager assigned, as an example to channel 1 (102) and transmission slot 1 (110), to scan from channel to channel and maintain operation in transmission slot 1 on each of the channels. Pagers assigned to other transmission slots also remain in the assigned transmission slot as they scan from channel to channel. Pagers assigned to a predetermined channel and transmission slot normally operate only on that channel and transmission slot when the pager is in the home, or local geographical area, as will be described in detail shortly. All other pagers which are not operating in the home area, otherwise referred to as roaming pagers, would scan all channels to locate those channels available in each geographic area in which the roaming pager is operating.

Figure 2A:
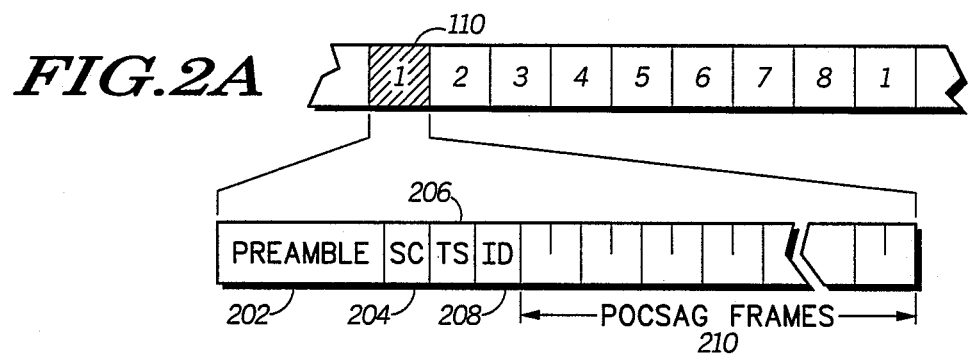
FIGS. 2A and 2B show timing diagrams for alternate embodiments of a typical transmission slot utilized in the multiple frequency messaging system of the preferred embodiment or the present invention.
Figure 2B:
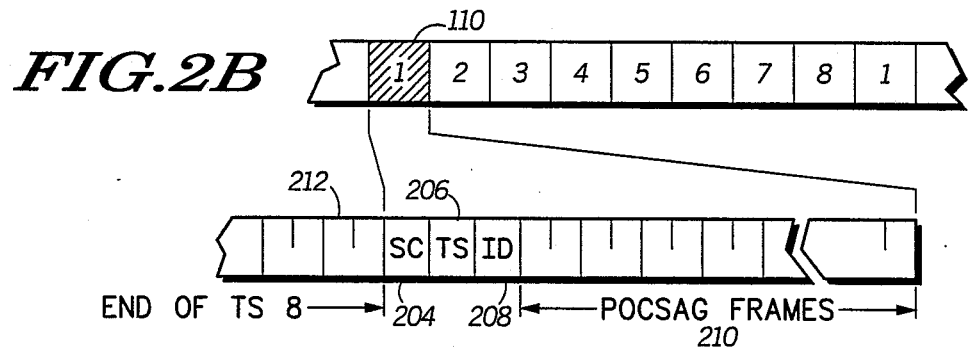

The format of the information transmitted in each transmission slot is shown in the timing diagrams of FIGS. 2A and 2B which are alternate embodiments for the transmission slot signaling format. FIG. 2A shows an embodiment wherein a sequence of binary information is transmitted to provide bit synchronization, such as an alternating one/zero bit pattern, followed by synchronization information providing word synchronization. FIG. 2B shows the alternate embodiment, wherein bit synchronization is simultaneously obtained from the transmitted data of the previous transmission slot. Both forms of bit synchronization are well known to one of ordinary skill in the art.

Referring to FIG. 2A, coded message signals, which are transmitted during each transmission slot 110, include a preamble 202, synchronization information 204, transmission slot identity information 206, channel identification information 208, and message segment 210 shown as a group of POCSAG frames. Several functions are provided by preamble 202 in this first embodiment. Even though the transmission slots are synchronously transmitted from channel to channel, the transmission slot offset is difficult to precisely maintain, therefore, preamble 202 provides for small differences in the transmitted offset. Also, as the pager scans channels, there is time required to lock to the next channel, or new frequency of operation. This is also compensated for by preamble 202. Finally, preamble 202, as previously described, is a binary one/zero bit pattern which allows a decoder to obtain bit synchronization with the received information, or data stream.

The synchronization information 204 in the preferred embodiment of the present invention is one of the thirty-two bit POCSAG code words reserved for synchronization. Since the system of the present invention may co-exist in a particular geographic area with conventional POCSAG and other paging format systems, one of the reserved POCSAG synchronization words is used to prevent a pager which is scanning to lock to a conventional POCSAG or other paging format channel. Synchronization information 204 provides word synchronization for the address and message decoder, as in the POCSAG signaling format.

Transmission slot identity information 206 is a binary word, such as a three bit binary word for an eight transmission slot system or a four bit binary word for a sixteen transmission slot system. It will be appreciated that other bit lengths and bit length encoding formats may be used for systems employing same, more, or less transmission slots. Transmission slot identity information 206 is used during sync acquisition by the pager to locate the transmission slot to which the pager is assigned and as a check that a scanning pager has found the correct transmission slot on each channel as the pager scans.

Channel identification information 208 is also a standard binary word, as for example, a ten bit binary word for identifying 1024 unique channels or provider identification to be described shortly. The channel identification information may be utilized in a variety of ways. A common channel identification information code word may be assigned to all operational channels in each geographical area. Each pager is assigned the common channel identification information and a predetermined channel in each area.

The channel identification information 208 may also be assigned corresponding to a particular paging service provider in each geographical area where the provider offers the paging service. When a particular paging service provider offers multiple channels in the same geographical area, only those pagers assigned to that provider would be assigned to a predetermined channel. All other pagers operating in the same geographical area to providers operating only a single channel would be assigned only the predetermined channel identification information code word which identifies both the provider and the channel of operation.

The channel identification information may also be uniquely assigned to all channels in each geographical area, resulting in the channel identification information uniquely identifying both the paging service provider and the channel of operation in all areas. Channel identification information 208 described is used by all pagers to locate the home or local channel and may be used to identify the geographical area, depending on how the channel identification information is assigned. Both the transmission slot identity information code word and the channel identification information code word are stored in the code plug of each pager, and where appropriate, the operating channel number as previously described. In the preferred embodiment of the present invention, the transmission slot identity information code word and the channel identification information code word are part of a thirty-two bit POCAG code word, leaving eight additional reserve bits available for other purposes, such as channel assignment previously described.

Message segment 210 in the preferred embodiment of the present invention comprises eight POCSAG frames, each frame capable of two address code words, or an address and message code word, or two message code words. When required to provide additional throughput the number of frames utilized in message segment 210 may be increased, depending on such system requirements as the number of subscribers in the system, the required message throughput and battery saving capability. When a message extends beyond the length of message segment 210, the preferred embodiment of the present invention operates with the pager continuing to receive the remainder of the message in the next transmission slot, even though the pager is not normally assigned to operate in that transmission slot. In this situation, the pager resynchronizes on the synchronization information of the current channel, ignoring the transmission slot identity information, to complete reception of the message.

It will be appreciated that in order to provide redundancy for the purpose of reducing errors due to the radio channel, it is possible to interleave the transmission of the POCSAG code words of message segment 210 in the manner of the interleaving of a GSC message block. In such interleaving, the first bit of the first code word is transmitted followed by the first bits in order of all or a defined portion of the code words within a message segment 210. The second bits of the defined portion of the code words are then transmitted in order, followed by the third bits, etc., until all bits within the defined portion have been sent. When the defined portion is less than the entire message segment, further defined portions are sent in the same manner until the entire message segment has been transmitted.

It will be appreciated that in order to provide redundancy for the purpose of reducing errors due to the radio channel, an alternate method is to repeat the transmitted information. It is possible to have a defined relationship between the transmitted first sent information and the transmitted repeat thereof. An example of such a defined relationship would exist when the transmitter first sent information occupies the first half of a time slot and the transmitted repeated information occupies the second half of a time slot. Other defined relationships between the transmitted first sent information and the transmitted repeated information may be employed.

The operation of the alternate embodiment of the present invention for acquiring bit synchronization is shown in FIG. 2B. The operation of the pagers in this system and the information transmission is identical to that described in FIG. 2A except that the requirement for transmission of preamble 202 is eliminated by enabling the pager to bit synchronize on data which is obtained during the reception of message segment 210 in the previous transmission slot. Consequently, channel capacity and message throughput in the system is improved. In a system in which pagers bit synchronize on data, it will be appreciated that a time interval is required for the pager to scan from one channel to the next in the scanning mode. In the alternate embodiment, a unique set of pagers which do not scan may be assigned to the last POCSAG frame on all channels in each geographical area in the system. Such assignment would allow scanning pagers assigned to other frames in the message segment adequate time to scan to the next channel without any loss of messages.

Figure 3:
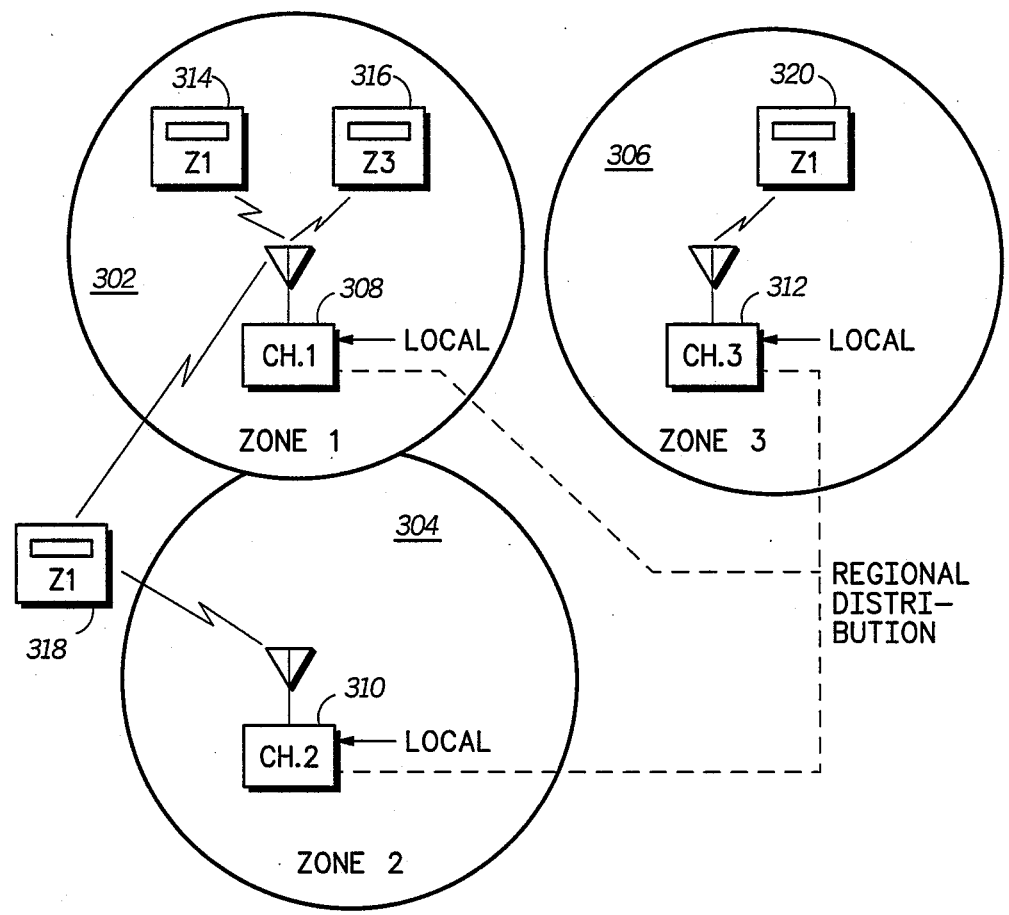
FIG. 3 shows an electrical block diagram of a multiple frequency messaging system utilizing the preferred embodiment of the present invention.

FIG. 3 shows an electrical block diagram of the multiple frequency messaging system 300 utilizing the preferred embodiment of the present invention. As shown in FIG. 3, three geographic areas, or zones, represented as zone 1 (302), zone 2 (304), and zone 3 (306) are illustrated for example. It will be appreciated by one of ordinary skill in the art that additional zones or geographical areas may be provided in the preferred embodiment of the present invention. As further shown in FIG. 3, each zone includes at least one transmitter, shown as transmitter 308, transmitter 310 and transmitter 312 operating on one of the eight previously described channels available. It will also be appreciated that multiple channels may be utilized in any given zone or geographical area, depending upon the number of subscribers requiring paging service, or dependent on the number of paging service providers providing service in each geographical area. It will further be appreciated that while only a single transmitter is shown for transmission on a given channel, multiple transmitters operating on the same channel in a simulcast transmission mode are generally required to provide wide area coverage. Shown operating in each zone are pagers 314, and 316 in zone 1 (302), pager 318 between zone 1 (302) and zone 2 (304) and pager 320 operating in zone 3 (306). For purposes of discussion, pager 314 is a pager assigned to a zone 1 channel, while pager 316 is out of its normal service area, normally assigned to a zone 3 channel. Pager 318, assigned to a zone 1 channel, is shown just beyond the coverage areas of zones 1 (302) and zone 2 (304), as might occur when pager 318 is in transmit from zone 1 (302) to zone 2 (304). Pager 318 could also be in the overlap area of zone 1 (302) and zone 2 (304). Pager 320 is assigned to a zone 1 channel, which is shown now operating in zone 3 (306). The operation of each of the pagers in the conditions described is as follows. Pager 314 which is assigned to a channel in zone 1 (302) operates only on the channel and in the transmission slot to which it is assigned as pager 314 is operating in the home area. Pager 314 does not scan, as pager 314 has recognized the assigned channel identification information transmitted by transmitter 308. All messages, whether they be locally originated, or from outside the geographical area are transmitted from transmitter 308. In contrast, pager 316, normally assigned to the zone 3 (306) service area, is now operating in zone 1 (302). In this situation, because the channel identification information transmitted on any operating channel in zone 1 (302) does not match any channel identification information stored in pager 316, pager operates in the scanning mode, scanning all possible channels for messages. These messages may be locally originated in pager 316's home area, or originated in the present area pager 316 is operating. In the instance where messages originated in pager 316's home area, these messages are forwarded from zone 3 (306) to zone 1 (302) after the pager 316 subscriber has contacted the zone 3 service provider, indicating the pager would be operating in another zone, in this example, in zone 1 (302). Routing of messages from zone 3 (306) to zone 1 (302) may be accomplished using landline, or telephone communication, or an RF signal, such as by satellite, when the distances between geographical areas is large. Such routing of information from system to system is well known in the art.

The operation of pager 318, which may be in transit between zone 1 (302) and zone 2 (304), or in the overlap area of both zones is next considered. When pager 318 is in transit between zone 1 (302) and zone 2 (304) there will be a point at which the signal receive from transmitter 308 or transmitter 310 becomes such that the channel identification information is not reliably detected from one or the other transmitter. At such time, pager 318 enters the scanning mode, previously described. When pager 318 is in transit from zone 1 (302) to zone 2 (304), previous arrangement would be made to route the messages from transmitter 308 to transmitter 310. Depending on the length of time to travel between zones, messages may be transmitted in both zones for some period of time to insure their reception. While in zone 2 (304), pager 318 will continue in the scanning mode until pager 318 again detects the assigned channel identification information upon returning to zone 1 (302).

When pager 318 is operating in the overlap of zone 1 (302) and zone 2 (304), and pager 318 fails to reliably detect the home channel identification information for a period of time, or determines the signal strength is not adequate to reliably detect the home channel identification information, pager 318 enters the scanning mode. Unlike prior art systems which result in a complete loss of message reception from transmitter 308 during the scanning interval, no loss of message reception is encountered in the preferred embodiment of the present invention. Pager 318 will begin scanning all channels, eventually returning to the assigned transmission slot on the home channel. If the received signal is adequate for message reception at this time, pager 318 will be insured of receiving the messages.

The operation of pager 320 in zone 3 (306) is the same as described for pager 316 operating in zone 1 (302). It will be appreciated there is a time period during the movement of pager 320 from zone 1 (302) to zone 3 (306), where pager 320 may completely lose synchronization with either transmitter 308 and transmitter 312. When this occurs, pager 320 continues scanning, in channel acquisition mode, to be described shortly, until the signal from transmitter 312 is detected. At this point, pager 320 will synchronize to the assigned transmission slot, remaining in the scanning mode for the reception of any messages to be transmitted from transmitter 312.

Figure 4:
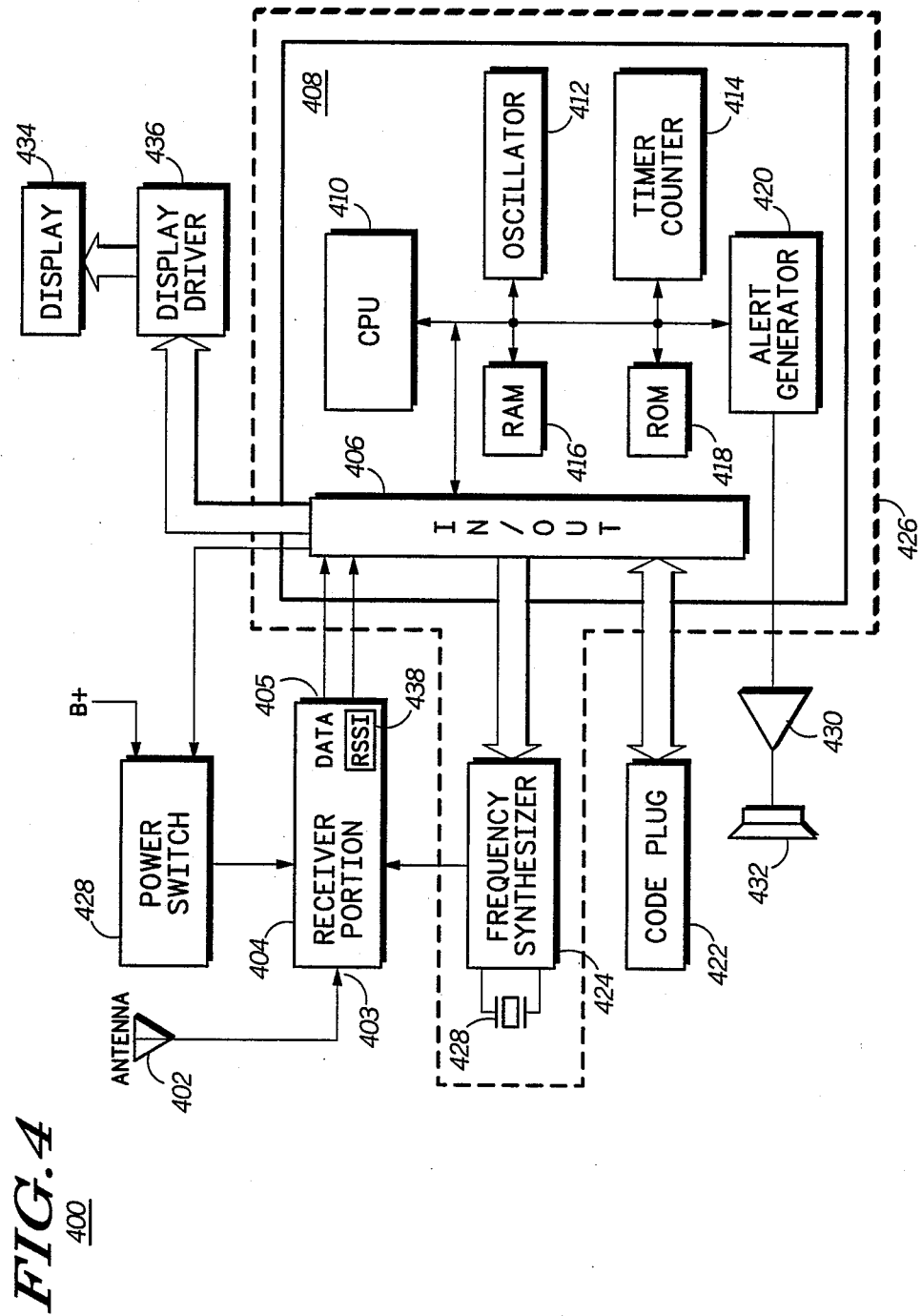
FIG. 4 shows a block diagram of a scanning receiver suitable for use in the multiple frequency messaging system of the preferred embodiment of the present invention.

FIG. 4 shows an electrical block diagram of receiver means, or scanning receiver 400 utilized in the preferred embodiment of the present invention. Coded message signals transmitted as previously described are received by antenna 402 which couples to the input 403 of receiver 404. Receiver 404, in the preferred embodiment of the present invention, is an FM receiver. The received coded message signals are processed by receiver 404 in a manner well known to one of ordinary skill in the art, and provided at the output 405 as a serial stream of binary information. The output 405 couples to the input/output (I/0) port 406 of microcomputer 408. Receiver 404 includes received signal strength indicating means RSSI 438 which also connects to the I/0 port 406 of microcomputer 408. Microcomputer 408, such as a Motorola MC68HC05L6 microcomputer, performs a variety of functions. Microcomputer 408 includes a CPU 410, oscillator 412, timer counter 414, random access memory (RAM) 416, read only memory (ROM) 418 and alert tone generator 420. CPU 410 controls the operation of receiver 400 and processes the received coded message signals. Oscillator 412 provides the clock for the operation of CPU 410, and provides the reference clock for timer counter 414. The oscillator frequency is controlled by a crystal, not shown in the diagram. Assigned transmission slot and channel identification information and pager addresses are stored in code plug 422 which is a programmable read only memory, such as an electrically erasable programmable read only memory, or EEPROM. RAM 416 is used to store code plug information when receiver means 400 is initially turned on, and to store any messages as they are received. ROM 418 contains the firmware controlling the microcomputer operation. The firmware includes such programs as for controlling the decoding of transmission slot identity information, channel identification information, pager address, receiver scanning, and other receiver functions. Alert generator 420 generates an audible alert signal upon reception of a message.

When scanning receiver means 400 is initially turned on, microcomputer 408 functions as a synchronization means, enabling scanning receiver means 400 to synchronize to the assigned transmission slot. Microcomputer 408 also functions as the decoder for decoding both channel identification information and pager address. Microcomputer 408, in conjunction with frequency synthesizer 424, functions as a channel selecting means 426 used to control the scanning of receiver means 400 when predetermined channel identification information is not detected on the home, or local, channel to which receiver means 400 is assigned. Microcomputer 408, in conjunction with power switch 428, provides a battery saving function for receiver means 400. Operation of the battery saving function will be described in detail when considering FIG. 7.

In the preferred embodiment of the present invention, a unique synchronization code word is assigned to all channels in each geographical area which are part of the system. This synchronization code word enables receiver means 400 to determine whether or not the channel currently selected is a member of the system. When receiver means 400 determines the channel to which receiver means 400 is tuned is not a member of the system, power is removed from receiver 404 and restored at the next assigned transmission slot on the next channel. Power is also removed from receiver 404 when it is determined the channel to which receiver means 400 is tuned is not operational in the geographical area receiver means 400 is operating.

When an address is decoded by microcomputer 408 operating as an address decoder, the message information transmitted during the message segment, which may be numeric or alphanumeric, is received and stored in memory, such as RAM 416. Alert generator 420 is enabled after the message has been stored, generating an alert signal which couples to the input of alert driver 430. The output of alert driver 430 couples to a transducer 432 for delivering an audible alert indicating the reception of a message. While not specifically shown in FIG. 4, other means of alerting, such as tactile, by enabling a vibrator, or visual, by enabling a lamp or LED, may also be utilized. Furthermore, the alert tone may be terminated, and the message presented on display 434 by means of a switch or pushbutton (not shown) in a manner well known to one of ordinary skill in the art. In this instance, the message is recovered from memory 416, and delivered to display driver 436 through I/0 406 for presentation on display 434.

Figure 5:
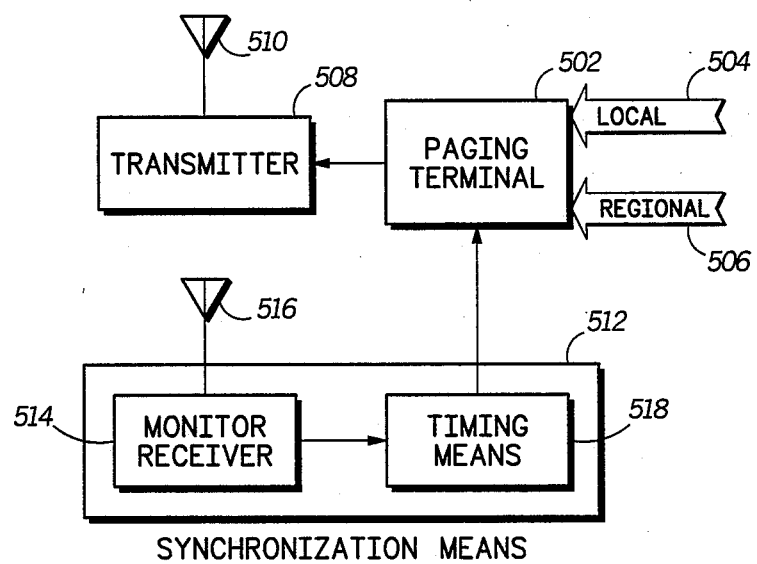
FIG. 5 shows a block diagram of a transmitter for use in the multiple frequency messaging system of the preferred embodiment of the present invention.

FIG. 5 is a block diagram of the transmitter means 500 of the present invention. Transmitter means 500 comprises a paging terminal 502 used to enter messages originated in the home, or local area 504, or from other geographic areas 506. Messages entered in the home area 504 are generally by means of a telephone which allows the entry of numeric messages, or via an alphanumeric entry device which allows entry of alphanumeric messages. In the case of alphanumeric messages, a modem is used for the transmission of the message from the alphanumeric entry device to paging terminal 502. Messages entered from geographic areas other than the home area 506 may be entered either by a hardwire interconnect, such as a dial up or hardwired phone line, or by means of an RF signal, such as a satellite receiver. Messages entered into paging terminal 502 are processed for transmission into the signaling format previously described. The address identifying the pager to which the message is intended is generated, and in the case of the POCSAG signaling format, the message is formatted into one or more data code words. It will be appreciated other signaling formats can also be used for address and message delivery. The messages are placed in queues corresponding to the transmission slot and POCSAG frame to which the pager is assigned. The output of paging terminal 502 couples to transmitter 508 for transmission via antenna 510. It will be appreciated that paging terminal 502 may control more than one transmitter, as encountered in a wide area simulcast paging system. In multiple transmitter systems, the transmission of the individual transmitters are synchronized for effective transmission. Various methods for synchronizing the transmitters are available, such as described in U.S. Pat. No. 4,718,109 to Breeden et al., entitled "Automatic Synchronization System" which is incorporated by reference herein. In addition to synchronizing the individual transmitters for wide area simulcast transmission, the transmitter means providing operation on each channel in a given geographical area requires synchronization with other transmitter means in the same area so as to allow the pager to scan from channel to channel and maintain synchronization with an assigned, or predetermined, transmission slot. Synchronization is controlled by providing an additional synchronization means 512 which provides a reference by which transmissions on all channels in a given area are synchronized. The synchronization may be accomplished in a manner similar to that described in Breeden et al., wherein one of the paging service providers is established as a reference for determining the start of each transmission slot, or cycle. A reference signal, which may be included in each transmission slot, is received via antenna 516 and monitor receiver 514 enabling transmitter means 500 to establish the beginning of each transmission slot, or cycle. The output of monitor receiver 514 couples to timing means 518 which processes the received information and generates timing pulses indicating the start of each transmission cycle. Alternatively, synchronization means 512 may monitor a time standard signal, such as transmitted by WWVB, thereby providing an absolute time reference by which to synchronize all transmitters on all channels in the system, including those transmitters located in different geographical areas. In those situations where geographical areas are widely separated, the first method is adequate. However, in those situations where transmissions from different geographical areas overlap, the use of an absolute time reference would insure synchronization of all channels in each area of operation.

Figure 6:
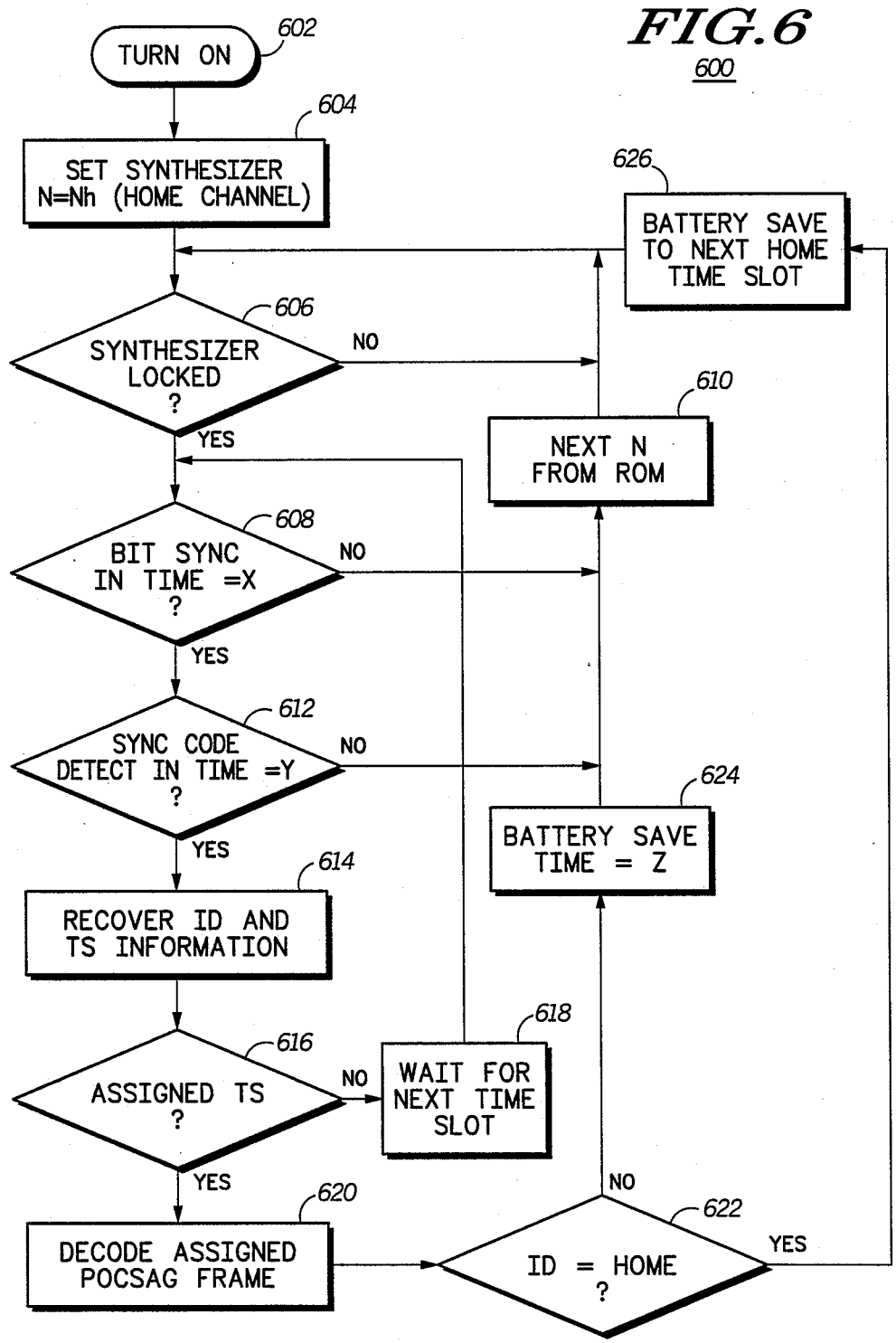
FIG. 6 shows a flow chart of the scanning receiver operation for the multiple frequency messaging system of the preferred embodiment of the present invention.

FIG. 6 is a flow chart describing the operation of a pager in the multiple frequency messaging system of the present invention. After the pager is first turned on, as shown at block 602, the frequency synthesizer is set by the microcomputer to the home channel, as shown at block 604. The synthesizer is allowed to lock on frequency, as shown at block 606. When the microcomputer has determined the synthesizer is not locked, additional time is provided, as shown at block 606. When the microcomputer determines the synthesizer has locked, as shown at block 606, the microcomputer begins to monitor the received information, in an attempt to establish bit synchronization, as shown at block 608. When, after a predetermined time interval the microcomputer determines that no information is present from which bit synchronization can be obtained, as in the case of being tuned to a non-operational channel, as shown at block 608, the microcomputer increments a channel counter, as shown at block 610, thereby selecting the next channel. Again, time is provided for the synthesizer to lock, as shown at block 606. The microcomputer continues to look for a channel which is operational so as to obtain bit synchronization. Once an operational channel is selected and bit synchronization is obtained, as shown at block 608, the microcomputer begins to correlate for the synchronization code word. As previously described, the synchronization code word is uniquely assigned to all channels operating in the system. When a synchronization code word is not detected in a predetermined time, or when the synchronization code word detected is not the one assigned to the particular system, as shown at block 612, the microcomputer again increments the channel counter selecting the next available channel, as shown at block 610, repeating the steps of allowing the synthesizer to lock, as shown at block 606, bit synchronization, as shown at block 608 and synchronization code word detection, as shown at block 612. Once the predetermined synchronization code word has been detected, as shown at block 612, the channel identification information and the transmission slot identity information is recovered from the received information and stored in memory, as shown at block 614. The microcomputer checks the transmission slot identity information, as shown at block 616. When the received transmission slot is not the slot to which the pager is assigned, as shown at block 616, power is removed from the receiver for battery saving purposes until the next expected transmission slot. Power is then supplied to the receiver, the channel identification information and transmission slot identity information are recovered, as shown at block 614, and the transmission slot identity information again checked. It will be appreciated that the microcomputer need not supply power to the receiver for each transmission slot while the pager is attempting to acquire transmission slot synchronization. When the transmission slot identity information has been determined, the microcomputer can remove power from the receiver for a time interval corresponding to the next occurrence of the pager's assigned transmission slot. This improves battery life by reducing the power consumption during initial acquisition. When the assigned transmission slot has been found, the address and message information transmitted during the message segment in the pager's assigned POCSAG frame is received, as in the situation where the pager is operating in the scanning mode, as shown at block 620. When a message is received during this time, the message is stored, and the user is alerted, as previously described. The microcomputer next checks the channel identification information stored in memory, as shown at block 622. While this check is shown after block 620, it will be appreciated the channel identification information could also have been checked before the POCSAG frame is received. When the channel identification information is not the same as assigned to the pager, indicating the pager is not in the home, or local geographical area, as shown at block 622, the microcomputer again removes power to the receiver, as shown at block 624, until the next occurrence of the assigned transmission slot in the next transmission cycle. The microcomputer then increments the channel counter, as shown at block 610, selecting the next channel, and blocks 606 through 622 are repeated. When the microcomputer has determined the channel selected was the home channel, as shown at block 622, the microcomputer removes power from the receiver, as shown at block 626, until the next assigned transmission slot is expected to be transmitted, whereupon power is supplied to the receiver to receive the coded message signals.

Figure 7:
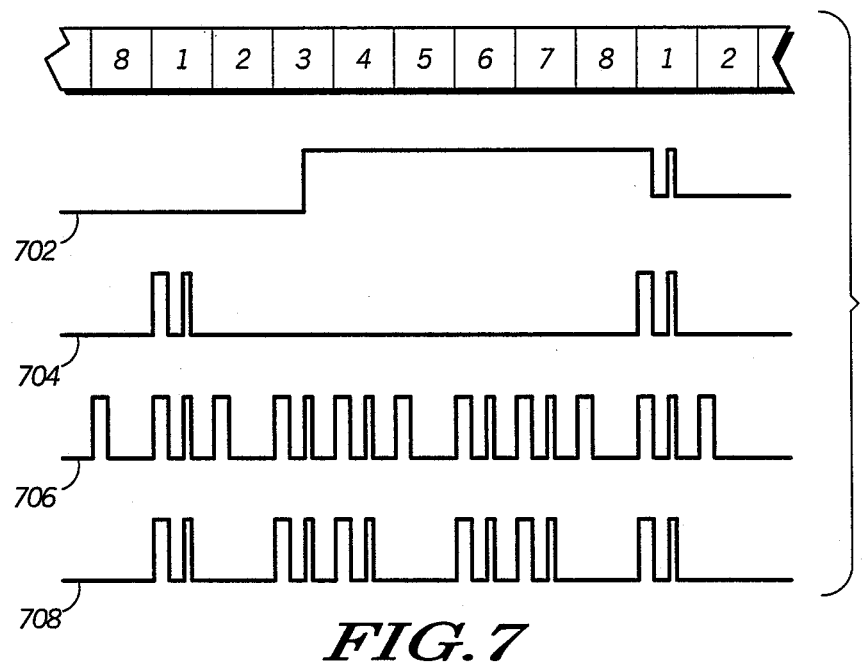
FIG. 7 shows a timing diagram describing various modes of battery saver operation for a scanning receiver operating in the multiple frequency messaging system of the preferred embodiment of the present invention.

FIG. 7 shows a timing diagram of the receiver operation at various operating times as compared to their occurrence during a transmission slot. Waveform 702 shows an example of the operation immediately after the receiver is turned on, and acquisition of the assigned transmission slot is achieved. During transmission slot #3, the receiver is turned on, and as shown, remains on until the assigned transmission slot is located, which in this instance is transmission slot #1. The receiver is then switched off until the occurrence of the POCSAG frame to which the receiver is assigned, at which time power is again applied to the receiver for the duration of the assigned frame. It will be appreciated that if the receiver was turned on and selected a channel that was not operational in a particular geographical area, waveform 702 would not apply, until one of the operational channels was selected.

Waveform 702 also applies to a receiver which has entered a new geographical area and is initially acquiring synchronization in that area. It will also be appreciated, that while the pager is in transmit between geographic areas, the pager can lose synchronization completely until the next geographic area is entered. In the interim, when the pager has determined no signals are detectable, such as after two complete cycle scans, the pager can also go into a extended battery saver cycle, remaining off for one or more additional battery saving cycles, and then rescanning the channels.

Waveform 704 shows normal receiver operation for a receiver that is operating on the home channel. As shown, power is only supplied to the receiver during the assigned transmission slot for time intervals needed to acquire synchronization and to decode the assigned POCSAG frame.

Waveform 706 shows the scanning receiver operation, when the receiver is operating in a geographical area other than its assigned area. In this case, the power to the receiver is supplied during the assigned transmission slot on each channel, for synchronization and to decode any information in the assigned POCSAG frames. It will be appreciated, that not all channels may be operational in a given geographical area. Furthermore, in the preferred embodiment of the present invention, a unique synchronization code word is assigned to all channels which are part of the system. This enables the receiver to determine whether or not the channel selected is a member of the system. When receiver means 400 determines the channel to which it is tuned is not a member of the system, power can be removed from the receiver and restored at the next transmission slot on the next channel without having to decode information in the POCSAG frame. Power is also removed from the receiver when it is determined the particular channel to which receiver means is tuned is not operational in the geographic area receiver means is operating. This additional battery saving feature is shown in waveform 706 during those transmission slots during which the receiver was not powered for decoding of the POCSAG frame.

Waveform 708 shows the scanning receiver operation, similar to that described in waveform 706. However, as shown by waveform 708, the scanning receiver not only battery saves during the POCSAG frame to which the pager would be normally assigned, but also battery saves during the synchronization information, on those channels which are non-operational in the given geographical area, or are operating as conventional POCSAG or other system. In this instance, the scanning receiver described would initially scan the channels as shown in FIG. 7. When after a number of system cycles, such as five cycles, the scanning receiver determines which channels are non-operational or conventional systems. The scanning receiver then stores this information in memory. When any of these non-operational channels are scheduled to be scanned, the scanning receiver battery saves until the next operational channel. Occasionally, the scanning receiver will scan these non-operational channels, such as at ten minute intervals, to verify the channels remained non-operational and to insure the pager has not entered a different geographical area having different non-operational channels.

An alternate embodiment of the above operation may also be provided by prestoring information in memory on the operational channels in those geographical areas the scanning receiver is anticipated to be traveling. The scanning receiver, once in any of the geographical areas, can determine which area the pager is in, by decoding the channel identification information. Thereafter, the pager operates in a battery saver cycle appropriate to that area.

Additional alternate embodiments of the above operation may be provided in the case where transmitted information is repeated with a defined relationship between the first sent information and the repeated information. In a first alternate embodiment, when the receiver portion 404 includes a radio signal strength indicating means, RSSI 438, with output connected to the microcomputer 408, it is possible for the microcomputer to recognize when the received RF signal is above or below predetermined threshold. When the received RF level was above the predetermined threshold for the entire duration of the portions of interest of the received first sent information, power to the receiver is switched off for the duration of the transmitted repeated information. When the received RF level was below the predetermined threshold for portions of interest of the first sent information, power is switched on for the repeat of those portions of the information which were below threshold when first sent.

In a second embodiment, the function of the RSSI 438 is replaced by a function of the microcomputer 408. This microcomputer function monitors errors detected in the received code words based on the error detecting properties of the transmitted code. When errors detected in the portions of interest of the received first sent information are below a predetermined error rate, power to the receiver is switched off for the duration of the repeated information. When errors detected in the portions of interest of the first sent information are above a predetermined error rate, power is switched on for the repeat of those portions of the information which were above the predetermined error rate when first received.

While specific embodiments have been shown and described, further modifications and improvements will occur to those skilled in the art. All modifications which retain the basic underlying principles disclosed and claimed herein are within the spirit and scope of the present invention.

We claim:

1. A multiple frequency message system, comprising: transmitter means, for transmitting coded message signals on a plurality of channels, in a plurality of geographic areas, the coded message signals including individual channel identification information assigned to each of the channels in each of the geographic areas and message information being transmitted in a predetermined sequence of coded transmission slots on each of the plurality of channels in each geographic area, each coded transmission slot of the predetermined sequence being transmitted sequentially on each of the plurality of channels so as to preclude the simultaneous transmission of a correspondingly coded transmission slot on any two channels in each geographic area; and
receiver means, capable of receiving the coded message signals during a predetermined one of the coded transmission slots being sequentially transmitted on each of the plurality of channels, said receiver means including channel selecting means responsive to the received channel identification information, for sequentially selecting the predetermined coded transmission slot on each of the plurality of channels, when the channel identification information received on each of the plurality of channels does not match predetermined channel identification information.

2. The multiple frequency message system according to claim 1 wherein said channel selecting means further selects a predetermined one of the plurality of channels when channel identification information detected within the predetermined transmission slot matches predetermined channel identification information.

3. The multiple frequency message system according to claim 1 wherein the channel identification information assigned is different for each of the plurality of channels in different geographical areas.

4. The multiple frequency message system according to claim 1 wherein the channel identification information assigned is the same for each of the plurality of channels in the same geographical area.

5. The multiple frequency message system according to claim 1 wherein said transmitter means transmits different channel identification information on each of the plurality of channels in each of the plurality of geographical areas.

6. The multiple frequency message system according to claim 1 wherein each sequentially transmitted transmission slot includes coded slot identity information to which said receiver means is responsive for selecting the predetermined transmission slot on each of the plurality of channels.

7. The multiple frequency message system according to claim 6 wherein each transmission slot further includes synchronization information, and said receiver means further comprises receiver synchronization means responsive to the synchronization information for maintaining said receiver means synchronization for receiving the sequence of coded transmission slots transmitted on each of the plurality of channels.

8. The multiple frequency message system according to claim 6 wherein said transmitter means further comprises transmitter synchronization means for maintaining synchronization of the sequence of coded transmission slots being transmitted on each of the plurality of channels.

9. Receiver means, capable of receiving coded message signals, including individual channel identification information assigned to each of a plurality of channels in a particular geographic area and message information being transmitted in a predetermined sequence of coded transmission slots on each of a plurality of channels, each coded transmission slot of the predetermined sequence being transmitted sequentially on each of the plurality of channels so as to preclude the simultaneous transmission of a correspondingly coded transmission slot on any two channels in the particular geographic area, said receiver means comprising:
a receiver portion, capable of receiving the transmitted coded message signals during a predetermined one of the coded transmission slots being sequentially transmitted on each of the plurality of channels, and an output for detected channel identification information and message information; and
channel selecting means, responsive to the detected channel identification information, for sequentially selecting the predetermined coded transmission slot on each of the plurality of channels when the channel identification information detected on each of the plurality of channels does not match predetermined channel identification information.

10. The receiver means according to claim 9 wherein said channel selecting means further selects a predetermined one of the plurality of channels, when the channel identification information detected within the predetermined transmission slot matches the predetermined channel identification information.

11. The receiver means according to claim 9 wherein said channel selecting means comprises:
  decoding means, coupled to the receiver portion output, for decoding channel identification information and generating channel selecting signals in response thereto; and
  a frequency synthesizer, coupled to said receiver portion, for effecting the sequential selection of each of the plurality of channels in response to the channel selecting signals being generated.

12. The receiver means according to claim 11 wherein said coded message signals further include transmission slot identity information to which said decoder means is further responsive.

13. The receiver means according to claim 9 wherein said coded message signals further include synchronization information and said receiver means further comprises synchronization means responsive to the synchronization information for maintaining synchronization of said receiver means with the predetermined coded transmission slot on each of the plurality of channels.

14. The receiver means according to claim 13, further comprising battery saver means responsive to the received synchronization information to supply of power to said receiver portion during the predetermined coded transmission slot being sequentially transmitted on each of the plurality of channels when the received synchronization information does not match predetermined synchronization information.

15. The receiver means according to claim 14, further comprising memory means, coupled to said battery saver means, for storing information on one or more of the plurality of channels which are determined by said battery saver means as not operating in a given geographical area.

16. The receiver means according to claim 15, wherein the one or more of the plurality of channels not operating in a given area can be preprogrammed into said memory means.

17. The receiver means according to claim 15, wherein said battery saver means is responsive to the stored information on the one or more of the plurality of channels for inhibiting the supply of power to said receiver portion during the transmission slot on the channels which are not operating in a given geographical area.

18. A transmitter for a multiple frequency message system, comprising:
  transmitter means, for transmitting coded message signals on a plurality of channels in a plurality of geographic areas, the coded message signals including individual channel identification information assigned to each of the channels in each geographic area and message information, the coded message signals being transmitted in a predetermined sequence of coded transmission slots on each of the plurality of channels; and
  synchronization means, coupled to said transmitter means, for synchronizing the transmission of the predetermined sequence of coded transmission slots on each of the plurality of channels, wherein each coded transmission slot of the predetermined sequence is transmitted sequentially on each of the plurality of channels so as to preclude the simultaneous transmission of a correspondingly coded transmission slot on any two channels in each geographic area.

19. The transmitter for a multiple frequency message system according to claim 18 wherein said transmitter means transmits different channel identification information on each of the plurality of channels in different geographical areas.

20. The transmitter for a multiple frequency message system according to claim 19 wherein said transmitter means transmits the same channel identification information on each of the plurality of channels in the same geographic area.

* * * * *